United States Patent
Fester et al.

[11] 3,757,793
[45] Sept. 11, 1973

[54] ELECTROCHEMICAL CELL WITH STEPPED VOLTAGE OUTPUT

[75] Inventors: Keith E. Fester, Roseville; Richard L. Doty, White Bear Lake, both of Minn.

[73] Assignee: Medtronic, Inc., Minneapolis, Minn.

[22] Filed: Nov. 15, 1971

[21] Appl. No.: 198,823

[52] U.S. Cl............................ 128/419 P, 136/111
[51] Int. Cl.............................................. A61n 1/36
[58] Field of Search................... 136/111, 107, 20, 136/30, 6, 137, 120, 24; 128/422, 419 P

[56] References Cited
UNITED STATES PATENTS

| | | | |
|---|---|---|---|
| 2,708,683 | 5/1955 | Eisen | 136/20 X |
| 2,771,499 | 11/1956 | Fleischer | 136/24 |
| 2,829,189 | 4/1958 | Coleman et al. | 136/107 |
| 2,942,052 | 6/1960 | Bourke et al. | 136/6 |
| 3,057,356 | 10/1962 | Greatbatch | 128/422 |
| 2,772,321 | 11/1956 | Ensign | 136/120 R |
| 3,104,990 | 9/1963 | Solomon et al. | 136/20 |

*Primary Examiner*—Anthony Skapars
*Attorney*—Everett J. Schroeder et al.

[57] ABSTRACT

An electrochemical cell is provided having a stepped voltage output during its lifetime due to multiple composition anode and cathode construction. The stepped output voltage provides a beginning of life (BOL) voltage indication, a voltage output indicative of the main capacity of the cell, and an end of life (EOL) output voltage indication warning the user that the total battery capacity is nearly exhausted.

4 Claims, 3 Drawing Figures

PATENTED SEP 11 1973

3,757,793

% Depletion of total power capacity

INVENTORS.
KEITH E. FESTER
RICHARD L. DOTY
BY
Schroeder, Siegfried, Ryan & Vidas
ATTORNEYS.

ELECTROCHEMICAL CELL WITH STEPPED VOLTAGE OUTPUT

The present invention is directed both to primary and to secondary electrochemical cells and is more specifically directed to such cells wherein the voltage output of the cell changes in distinct voltage steps as the cell is depleted. That is, when the cell is in a fully charged condition the voltage across the terminals will be within a first value, the beginning of life (BOL) voltage, during the initial period of discharge and will undergo a stepped drop in voltage to a main operating voltage encompassing the major portion of the total cell power output. After the exhaustion of the ingredients forming the power source for the major part of power output a second stepped voltage drop will take place to a third voltage output, the end of life (EOL) voltage, which provides an indication to the user of the cell that the total power capacity of the cell is nearly gone.

It is also an object of the invention to provide electrochemical cells wherein a stepped output voltage is provided for an indication of the beginning-of-life (BOL) or end-of-life (EOL) cycle alone without having both cycles present.

IN THE DRAWINGS

Figure 1:
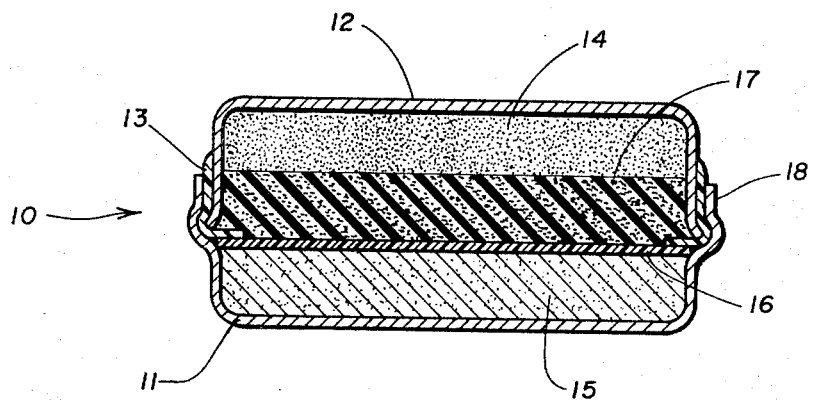
FIG. 1 is a cross-sectional view of a button cell in accordance with the invention.
Figure 2:
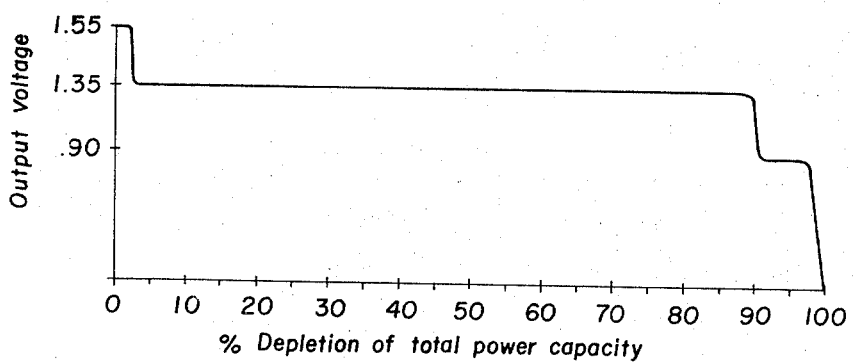
FIG. 2 is a plot of output voltage vs power capacity of cells in accordance with one form of the invention.

While the principles of the invention are equally applicable to both primary and secondary cells the invention will be described with particularity in its use in the primary cells. The most common primary cells are the common type used in flashlights of the so-called dry cell type and the button cells typically found in instruments such as hearing aids and photographic equipment. As the purchasers of both of these types of cells are aware cells that are purchased through retail outlets frequently have had their total power output depleted to a large extent through internal dissipation as a result of prolonged storage before actual use. The purchaser rarely has the facilities necessary for making a determination as to the state of charge of the cell he is purchasing. All that he can tell is that the cell is supposedly a new cell. Some retail stores provide a battery checker which will give an appropriate indication as to whether the battery has long passed its full charge condition, but these types of checkers are not entirely satisfactory in that they do not indicate with any precision the total remaining life within the battery.

For most uses it is not critical that the battery have a known total life. The user of the battery generally stands to lose only in the sense that he has paid full price for a "half-empty" cell. For other users this is not the case.

It is contemplated that the present invention will find its most important immediate use in the field of power supplies for medical cardiac pacers. It is known in the art that such pacers are commonly provided with a power source and electronics that in some instances are actually embedded within the body of the patient. The installation of such a pacer within the body of the patient is relatively costly. Therefore, it is of utmost importance that the battery used to power the device be at the top of its charged condition at the time it is installed so as to insure that the greatest possible lifetime can be expected from a single implantation. In accomplishing this purpose elaborate procedures have been developed for insuring that the power supplies are in fact at their peak charge condition. One such technique has been to x-ray the electrochemical cells to insure that the size of the anode and cathode is within the tolerance required for a full charge. While such a procedure works satisfactorily with certain types of electrochemical cell configurations it is not a technique which is applicable to all types of cells.

Even when the cells are known to be at a peak power state when they are installed within the patient there are many variables which tend to shift the life expectancy of the battery in a somewhat unpredictable manner. Therefore, a large margin for error must be provided for in a schedule of replacement of the implanted unit in order to insure that the patient does not encounter difficulties arising from a failure of the power source. What this means in practical terms is that the unit must be removed from the patient at points in time well ahead of the reasonable life expectancy of the batteries. This, of course, greatly increases the annual expense which the patient must pay.

In accordance with our invention we construct electrochemical cells in a manner so that at the full charge condition the output of the individual cells (or correspondingly of an array of cells in batteries) is at a voltage above the "normal" operating voltage of the pacer. Thus merely by checking the voltage across the electrodes of the cell one can determine whether the cell is in a fully charged condition. This initial voltage and ampere hour output of the cell is for only a relatively small percentage of its total ampere hour output—usually in the range of 1 to 15 percent of the total ampere hour output. Following this initial output the voltage of the cells decreases stepwise to its principal operating voltage which comprises in the vicinity of about 80 percent of the total power capacity of the cell. When the cell is near the point of total depletion the voltage output drops to a third value which gives an indication that the total power capability of the cell is nearing exhaustion. The third stage voltage and ampere hour output will be from 1 to 15 percent of the total ampere hour of the cell.

It will be apparent that initial voltage across the terminals of the cell can be readily checked before implantation. In the patient itself the increased voltage can, by appropriate circuit design of the pacer, act to increase the beats per minute of the heart to some value above the nominal desired, although well within a normal excursion of heartbeat. After this initial depletion has taken place the voltage of the cell to the pacer causes the heart to drop to a predetermined point of beats per minute (typically 72) and continues the heartbeat at this rate throughout the major portion of the cell life. When the main portion of the cell is exhausted the voltage drops to the third level. The patient will be able to readily ascertain that his heartbeat has declined to some predetermined value less than 72 and yet well within the range necessary to sustain life and reasonably normal activity. He will be alerted at this point that his pacer power supply is nearing depletion, and yet, will have adequate time to provide for replacement of the unit. Even if the patient is not aware of the shift in his heartbeat rate periodic examination will readily reveal this fact to the doctor. Of course, when the pacer is external to the patient periodic voltage checks will supply the information of the cells state of charge directly.

We accomplish the purposes of the invention outlined above through the use of an electrochemical cell which has an anode, a cathode and a suitable electrolyte all within a casing wherein either the anode or the cathode or each of them consists of a plurality of different materials each of which has an $E_o$ that differs from the other materials which comprise the anodes and cathodes. While we anticipate that our invention will find use in a variety of different types of electrochemical cells it will be described herein with principal reference to the alkaline-type of sealed button cell presently used in the pacer industry. While the invention will be described with great particularity to the alkaline cells it will be apparent to those skilled in the art of electrochemical cells that the principles of the invention are equally applicable to other types of cells. Likewise, while the invention will be described with particularity in regard to cells that are sealed against gas and vapor loss from the cell the principles will be likewise applicable to cells which are vented to the atmosphere.

In the field of alkaline-type cells the most common cell available is the zinc/mercuric oxide cell wherein the zinc metal is present in the form of an amalgam and the mercuric oxide is in powder form and is interspersed with silver particles which tend to absorb the mercury which is produced at the cathode and increase the conductivity of the cathode active material. For the sake of efficiency such cells are designed so that the quantity of zinc metal present is electrochemically nearly the same as the electrochemical equivalent of the cathodic depolarizer material. When an excess of either zinc or mercuric oxide is present the cell is considered to be either cathode limited or anode limited. The electrolyte used in such cells is typically an aqueous solution of potassium hydroxide of about 30 percent by weight concentration. For maximum storage life the electrolyte includes a quantity of zinc oxide dissolved therein to form a zincate. These matters are well known in the art.

In the examples which follow the electrolyte substance will be typically a 30 percent by weight solution of potassium hydroxide although it should be understood that other alkaline metal hydroxides can be used and one can incorporate as a portion of the electrolyte various additives depending upon the choice of anode and cathode materials.

A typical cell in accordance with the invention is shown in a somewhat schematic cross-sectional view in FIG. 1. It should be appreciated that a wide variety of cell configurations is possible using the principles of the invention. FIG. 1 is merely to illustrate one common form of cell that has been adapted to include the present invention. Turning to FIG. 1 it will be seen that the cell 10 consists of a lower cup member 11 and an upper cup member 12 which are nested together as shown. Cup members 11 and 12 are desirably of a metal that will be essentially inert to the ingredients contained within the cell itself, such as nickel metal or steel, that has been plated with a layer of nickel. Members 11 and 12 may also be copper. The open edges of cups 11 and 12 have been formed into a crimp seal 18 with an intervening spacer 13 of a resilient nonconductive material. Suitable materials are nylon, polyethylene, rubbers and the like. The material chosen should be one which is substantially inert to the electrolyte that is contained within the cell. For an alkaline cell this material should, of course, be capable of forming an essential hermetic seal and be inert under long-term exposure to strong caustic.

Pressed into the base portion of shell 12 is an anode-active material 14 which will be described in greater detail in the examples below. Pressed into shell 11 is a cathode-active material 15 which will likewise be described with greater particularity hereinbelow. Intermediate materials 14 and 15 is a barrier member 16 which operates to prevent transfer of material from anode 14 to the cathode material 15. Material 16 can be any of the conventional materials used for this purpose, such as microporous polyvinyl chloride, cellophane or grafted polyethylene. It should, of course, be a material which is substantially unaffected by exposure to the electrolyte within the cells. Also contained within the cell 10 is a quantity of an electrolyte substance generally designated 17. An electrolyte absorbent material commonly used in cells of this type can be included to hold the electrolyte.

As can be seen from the above description the present invention in its broadest aspects is substantially the same as the prior art construction. The invention differs from the prior art in its choice of materials for the anode-active material 14 and the cathode-active material 15. These will now be described in greater detail.

EXAMPLE 1

An anode-active material is formed by blending 2.0 grams of zinc powder with 0.2 grams of cadmium metal powder. A quantity of metallic mercury (approximately 0.2 grams) is added to this mixture to increase the conductivity and to decrease the tendency for the zinc to corrode in the cell. The powders are intimately blended together and pressed to form a pellet within the lower confines of cup 12. A cathode-active material is made up using 7.024 grams of mercuric oxide and 0.010 grams of silver oxide. This material is likewise formed into a pellet in the base of cup 11. An electrolyte of approximately 30 percent by weight potassium hydroxide is then introduced into the cell so as to contact both the anode- and cathode-active materials and the cell is sealed into a configuration like that of FIG. 1. The initial output voltage of the cell formed from these materials is that of the zinc/silver oxide couple and is approximately 1.55 volts. At a current drain of 20 microamps the voltage output of the cell would remain at this initial voltage for approximately 9 days. Following exhaustion of the zinc/silver oxide couple the voltage declines to approximately 1.35 volts—the output of the zinc/mercuric oxide couple. With the quantities of materials utilized in forming the cell and with a drain of 20 microamp current on the cell the voltage would remain at substantially this level for about 9.3 years assuming electrochemical efficiency of 100 percent. Of course, under higher current drain the time element would be considerably reduced. After exhaustion of the zinc/mercuric oxide couple the voltage output declines to approximately 0.90 volts which is representative of the cadmium/mercuric oxide couple. With the quantity of materials utilized in forming the cell and assuming again a current drain of 20 microamps the voltage would remain at this level for approximately 6½ months.

Of course, if a plurality of such cells were connected in series the initial voltage would be the sum of the number of cells in series and each incremental step would be the voltage output of the sum of the state of the cells in the series. For example, if three cells were series joined then assuming the cells each depleted one couple at different intervals the idealized stages of depletion would be: 4.65 volts, 4.45 volts, 4.25 volts, 4.05 volts, 3.60 volts, 3.15 volts, and 2.70 volts as the cells each reached a final voltage stage in their outputs.

EXAMPLE II

A number of cells may be prepared using the construction described in reference to FIG. 1 except that the cathode-active material is formed of a mixture of silver oxide and silver peroxide powders. The silver peroxide is present in quantities ranging from 1 to 15 percent of the silver oxide. The electrolyte is, as in Example I, a 30 percent by weight solution of KOH in water. The anode is the same as in Example I. As an alternative to blending the oxide and peroxide of silver one can produce the silver peroxide by electrolytic means by overcharging a silver oxide cathode material. The combined quantity of $Ag_2O$ and $Ag_2O_2$ is desirably slightly in excess of the electrochemical equivalent of the zinc and cadmium to produce a cell that is anode limited. The BOL voltage of the cell is that of the zinc/silver peroxide couple at approximately 1.85 volts at low current drain conditions. After exhaustion of this couple the voltage drops to the zinc/silver oxide couple with an output of 1.55 volts for the principal portion of the cell life. EOL indication is provided by the cadmium/silver oxide couple at a voltage of 1.15 for the end portion of the cell life.

EXAMPLE III

Another example of the invention utilizes cells prepared using zinc as the anode material and a mixture of silver peroxide, silver oxide and mercuric oxide as the cathode-active material. Silver peroxide constitutes 2 percent of the total electrochemical equivalent of the cathode-active material and the quantity of mercuric oxide constitutes 10 percent of the electrochemical equivalent cathode-active material. As in the preceding examples the total cathode-active material is electrochemically slightly in excess of the quantity of zinc. The BOL voltage is 1.85 volts (zinc/silver peroxide couple) which decreases to 1.55 volts (zinc/silver oxide couple) after depletion of the silver peroxide. The EOL voltage produced after exhaustion of the silver oxide is that of the zinc/mercuric oxide couple or 1.35 volts.

EXAMPLE IV

A cell is prepared as in the preceding examples with the exception of the choices of materials used for the anode and cathodes. The anode is prepared from powdered indium and cadmium metals while the cathode-active materials are a mixture of silver oxide and mercuric oxide. The couples are then:

| BOL | $In/Ag_2O$ | 1.35 volts |
| Principal | In/HgO | 1.18 volts |
| EOL | Cd/HgO | 0.90 volts |

As in the preceding examples the material determining the BOL couple life ($Ag_2O$) is desirably present in a quantity equivalent to from about 1 percent up to about 15 percent (preferably 1–5%) of total cell capacity and the EOL couple life determining substance (Cd) desirably is about 5 percent of the total cell capacity.

EXAMPLE V

A further example of our invention is a cell where the anode is zinc and indium and the cathode is a mixture of $Ag_2O$ and HgO. The corresponding couples will be:

| BOL | $Zn/Ag_2O$ | 1.55 volts |
| Principal | Zn/HgO | 1.35 volts |
| EOL | In/HgO | 1.18 volts |

As in the preceding examples the quantities of materials used to form the anodes and cathodes is dictated by the proportion of total cell life in each couple.

EXAMPLE VI

Still further examples of our invention are cells where the anode is zinc blended with either cadmium or indium and the cathode material is mercuric oxide and manganese dioxide. Where cadmium is the blended material with zinc the couples will be as follows:

| BOL | $Zn/MnO_2$ | 1.45 volts |
| Principal | Zn/HgO | 1.35 volts |
| EOL | Cd/HgO | 0.90 volts |

When indium is the blended material the couples would be:

| BOL | $Zn/MnO_2$ | 1.45 volts |
| Principal | Zn/HgO | 1.35 volts |
| EOL | In/HgO | 1.18 volts |

The principles of our invention should now be clear to those skilled in the art of electrochemical cells. Likewise, it will be readily apparent that a wide variety of materials are suitable for use in alkaline cells in addition to those set forth above. For example, other cathode-active materials of the oxide type such as copper oxide and manganese dioxide can be used while non-oxide cathode-active materials such as mercuric sulfate can be used. Choice of the active materials to be used will be dictated by matters such as the voltage output desired, tendency of the active materials or their reaction products to cause internal dissipation of the cells' energy and the like. Various known means can be used to increase conductivity of the electrodes such as mercury metal, silver metal, graphite and metallic grids.

The well-known nickel-iron alkaline cell is a further example of a cell which can be modified using the principles of the invention by including in the anode cadmium to form an EOL indicator.

The electrolyte for alkaline cells may be an aqueous solution of sodium hydroxide as well as potassium hydroxide and the concentration can be varied over broad limits although typically will be in the range of 30–50 percent by weight.

In accordance with the purposes of the invention it is important that the electrolytic couples comprising the cell be chosen so that the voltage steps be sufficiently large to be readily detectable and small enough so that the voltage output of the cell remains at useful levels. As shown in the examples the voltage charge from one couple to the next should be at least 0.1 volts and should be less than 0.5 volts.

The anodes which use two different metals can be formed by plating the different metals over one another rather than using powdered metals as described in the examples.

It should be recognized that some of the cells of the examples above will be preferred for use in pacers over others. For example, silver peroxide is less stable than silver oxide so cells made utilizing the peroxide would be less desirable for the purpose of pacer power supplies because of the greater instability. However, for other uses of less critical nature silver peroxide containing cells are satisfactory.

Figure 3:
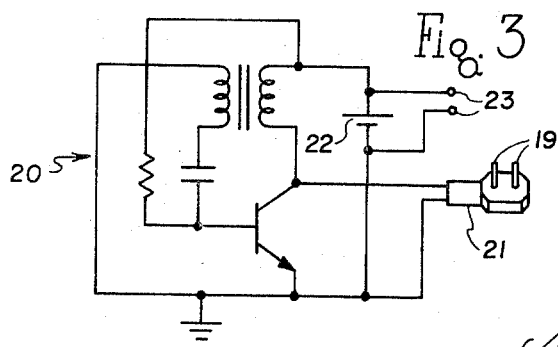
FIG. 3 is a circuit of a pacer including an electrolytic cell in accordance with the invention.

Referring to FIG. 3 there is shown a circuit diagram 20 of a pacer in accordance with the Greatbatch U. S. Pat. No. 3,057,356. An electrolytic cell power source 22 has been provided with test leads 23 which can be used to directly measure the output voltage and thus the state of charge of source 22. As the specific operation of the circuit does not form a part of our invention the reader is directed to the Greatbatch patent for further description if desired.

The embodiments of the invention in which an exclusive property or privilege is claimed are defined as follows:

1. In combination an electrical circuit defining a medical cardiac pacer and an electrolytic cell as a power source therefor, said cell comprising a casing, an anode and a cathode and an alkaline electrolyte positioned within said casing, lead means connecting said cell anode and cathode to said pacer electrical circuit, said anode and said cathode having a plurality of electrochemically active materials defining with said electrolyte first, second and third electrolytic couples, said first couple having a higher $E_o$ than said second couple and said second couple having a higher $E_o$ than said third couple, the first and third of said couples each comprising from about 1 to about 15 percent of the total ampere hour capacity of the cell.

2. A combination in accordance with claim 1 wherein said electrical circuit includes test terminals for determining the voltage output and thus the state of charge of said cell.

3. The combination in accordance with claim 1 wherein the electrochemically active material of said anode is zinc and the electrochemically active material of said cathode is a mixture of silver peroxide, silver oxide and mercuric oxide.

4. The combination in accordance with claim 1 wherein the electrochemically active materials of said anode are zinc and cadmium and the electrochemically active material of said anode is a mixture of silver peroxide and silver oxide.

* * * * *